(12) United States Patent
Wei et al.

(10) Patent No.: US 10,791,501 B2
(45) Date of Patent: Sep. 29, 2020

(54) ANCHOR BASE STATION, SLAVE CELL AND USER EQUIPMENT

(71) Applicant: Sony Corporation, Tokyo (JP)

(72) Inventors: Yuxin Wei, Basingstoke (GB); Brian Alexander Martin, Basingstoke (GB); Hideji Wakabayashi, Basingstoke (GB); Shinichiro Tsuda, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 16/312,580

(22) PCT Filed: May 9, 2017

(86) PCT No.: PCT/EP2017/061029
§ 371 (c)(1),
(2) Date: Dec. 21, 2018

(87) PCT Pub. No.: WO2017/220247
PCT Pub. Date: Dec. 28, 2017

(65) Prior Publication Data
US 2019/0215759 A1 Jul. 11, 2019

(30) Foreign Application Priority Data

Jun. 22, 2016 (EP) ..................................... 16175809

(51) Int. Cl.
*H04L 12/28* (2006.01)
*H04W 48/10* (2009.01)
(Continued)

(52) U.S. Cl.
CPC ......... *H04W 48/10* (2013.01); *H04W 72/048* (2013.01); *H04W 74/00* (2013.01);
(Continued)

(58) Field of Classification Search
CPC ... H04W 48/10; H04W 74/00; H04W 74/008; H04W 72/048; H04W 74/0833; H04W 74/004; H04W 88/04
(Continued)

(56) References Cited

FOREIGN PATENT DOCUMENTS

| EP | 2 328 379 A1 | 6/2011 | |
| EP | 2328379 A1 * | 6/2011 | ........ H04W 74/0833 |

(Continued)

OTHER PUBLICATIONS

International Search Report dated Nov. 7, 2017 for PCT/EP2017/061029 filed on May 9, 2017, 15 pages including English translation.

(Continued)

*Primary Examiner* — Mang Hang Yeung
(74) *Attorney, Agent, or Firm* — Xsensus LLP (57) ABSTRACT

A communications device acting as a relay device including a controller configured in combination with a transmitter and a receiver to receive from a remote communications device a first random access preamble message, the first random access preamble message comprising an identifier of the remote communications device, to transmit, in response to the first random access preamble message, a random access response message to the remote communications device, the random access response message comprising an indication of communications resources allocated to the remote communications device, to receive, from the remote communications device and using the communications resources indicated in the random access response message, a scheduled transmission comprising a connection request message and a first contention resolution identifier, and to transmit to the remote communications device a second contention resolution identifier.

21 Claims, 6 Drawing Sheets

(51) Int. Cl.
    *H04W 74/00* (2009.01)
    *H04W 74/08* (2009.01)
    *H04W 72/04* (2009.01)
    *H04W 88/04* (2009.01)

(52) U.S. Cl.
    CPC ....... *H04W 74/004* (2013.01); *H04W 74/008* (2013.01); *H04W 74/0833* (2013.01); *H04W 88/04* (2013.01)

(58) Field of Classification Search
    USPC .................................................. 370/254
    See application file for complete search history.

(56) References Cited

FOREIGN PATENT DOCUMENTS

WO        2015/039870 A1    3/2015
WO    WO-2015180890 A2 * 12/2015      H04W 72/0466

OTHER PUBLICATIONS

Holma, H. and Toskala, A., "LTE for UMTS—OFDMA and SC-FDMA Based Radio Access," Copyright © 2009 John Wiley & Sons, Ltd., Print ISBN: 978-0-470-99401-6, 11 pages.

Qualcomm Incorporated, "New Work Item: NarrowBand IOT NB-IOT," RP-151621, 3GPP TSG RAN Meeting #69, Phoenix, USA, Sep. 14-16, 2015, 8 pages.

Qualcomm Incorporated et al., "Further Enhancements to LTE Device to Device, UE to Network Relays for IoT and Wearables," RP-160677, 3GPP TSG RAN Meeting #71, Gothenburg, Sweden, Mar. 7-10, 2016, 7 pages.

Bertrand, P. and Jiang, J., "Random Access," In: Stefania Sesia; Issam Toufik and Matthew Baker: "LTE—The UMTS Long Term Evolution: From Theory to Practice, Second Edition," Copyright © 2011 John Wiley & Sons, Ltd. Published 2011 by John Wiley & Sons, Ltd., XP-002772945, pp. 371-376.

\* cited by examiner

ANCHOR BASE STATION, SLAVE CELL AND USER EQUIPMENT

CROSS-REFERENCE TO RELATED APPLICATIONS

This application is a National Stage Application based on PCT/EP2017/061029, filed on 9 May 2017, and claims priority to European Patent Application No. 16175809.9, filed on 22 Jun. 2016, the entire contents of which being incorporated herein by reference.

BACKGROUND

Field of Disclosure

The present disclosure relates to communications devices acting as relay devices which is configured to relay signals between an infrastructure equipment and a remote communications device in a mobile communications network, and specifically to a random access (RACH) procedure for a communications link between relay devices and remote communications devices.

The present disclosure claims the Paris convention priority to European patent application 16175809.9 the contents of which are herein incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. There has also been an increased requirement to provide efficient techniques to NB-IoT devices such as wearable devices, which may have only a short range facility for radio communications and so may be configured to transit to and receive from a wireless communications network via a relay node or device.

SUMMARY OF THE DISCLOSURE

According to a first example embodiment of the present disclosure, there is provided a communications device acting as a relay device configured to communicate with an infrastructure equipment of a mobile communications network and a remote communications device operating with the mobile communications network. The communications device acting as the relay device comprises a receiver configured to receive signals representing data via a first wireless access interface from the infrastructure equipment for transmission to the remote communications device and to receive signals representing data via a second wireless access interface from the remote communications device for transmission to the infrastructure equipment, a transmitter configured to transmit signals representing data via the first wireless access interface to the infrastructure equipment and to transmit signals representing data via the second wireless access interface to the remote communications device, and a controller configured to control the transmitter to transmit the signals and to control the receiver to receive the signals. The controller is configured in combination with the transmitter and the receiver to receive from the remote communications device a first random access preamble message, the first random access preamble message comprising an identifier of the remote communications device, to transmit, in response to the first random access preamble message, a random access response message to the remote communications device, the random access response message comprising an indication of communications resources allocated to the remote communications device, to receive, from the remote communications device and using the communications resources indicated in the random access response message, a scheduled transmission comprising a connection request message and a first contention resolution identifier, and to transmit to the remote communications device a second contention resolution identifier. If the first contention resolution identifier is the same as the second contention resolution identifier, the controller is configured in combination with the receiver to receive an indication from the remote communications device that a successful connection for data communications has been made between the remote communications device and the communications device acting as the relay device.

According to a second example embodiment of the present disclosure, there is provided a communications device acting as a relay device configured to communicate with an infrastructure equipment of a mobile communications network and a remote communications device operating with the mobile communications network. The communications device acting as the relay device comprises a receiver configured to receive signals representing data via a first wireless access interface from the infrastructure equipment and to receive signals representing data via a second wireless access interface from the remote communications device for transmission to the infrastructure equipment, a transmitter configured to transmit signals representing data via the first wireless access interface to the infrastructure equipment, and a controller configured to control the transmitter to transmit the signals and to control the receiver to receive the signals. The controller is configured in combination with the transmitter and the receiver to receive from the remote communications device a first random access preamble message, the first random access preamble message comprising an identifier of the remote communications device, to transmit the first random access preamble message to the infrastructure equipment, the first random access preamble message indicating to the infrastructure equipment that it should transmit a random access response message to the remote communications device, the random access response message comprising an indication of communications resources allocated to the remote communications device, to receive from the infrastructure equipment the indication of the communications resources allocated to the remote communications device, to receive, from the remote communications device and using the communications resources indicated in the random access response message, a scheduled transmission comprising a connection request message and a first contention resolution identifier, and to transmit the scheduled transmission to the infrastructure equipment. If the first contention resolution identifier is the same as a second contention resolution identifier transmitted to the remote communications device by the infrastructure equipment, the controller is configured in combination with the receiver to receive an indication from the remote communications device that a successful connection for data communications has been made between the remote communications device and the communications device acting as the relay device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
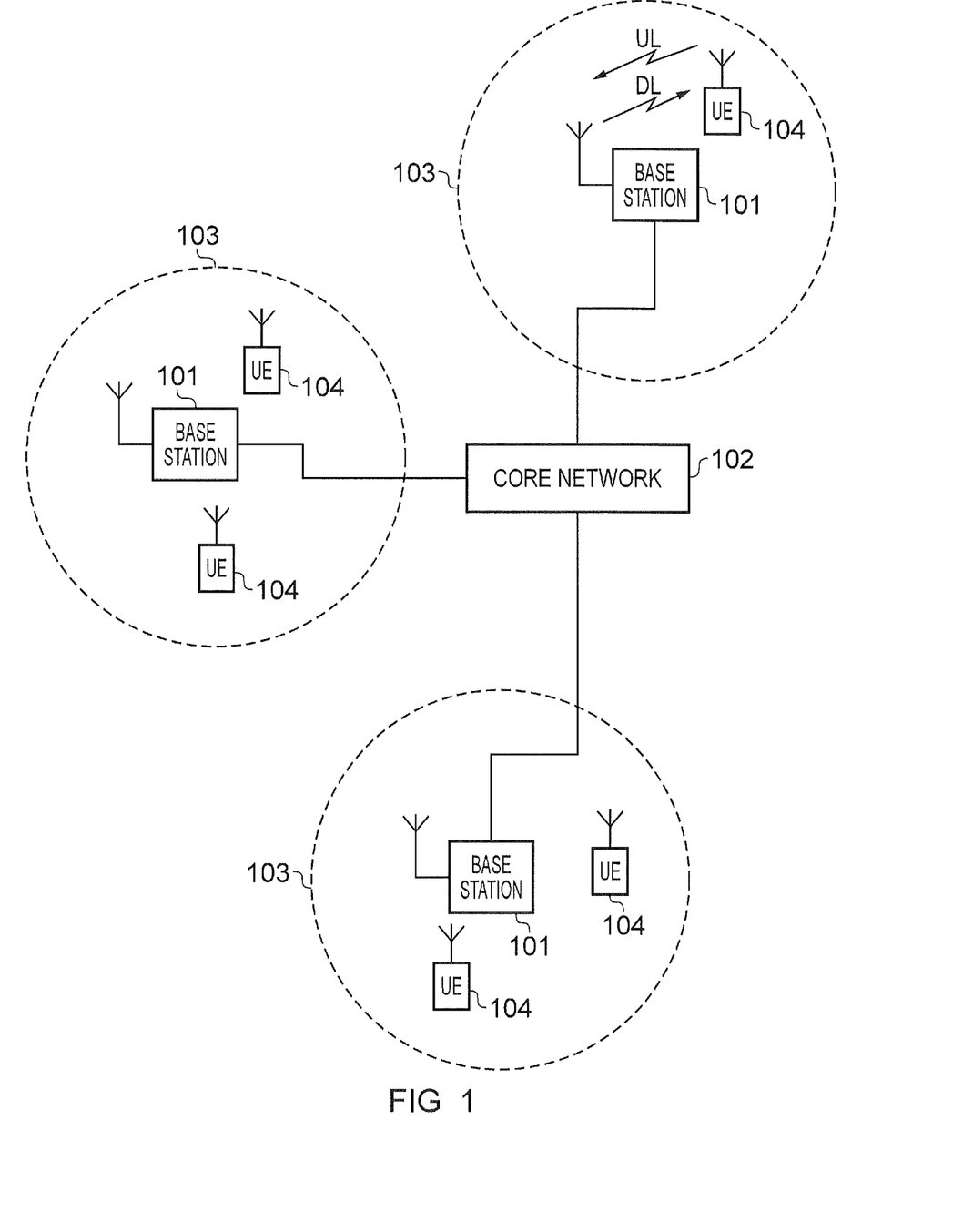
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A W. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

Figure 2:
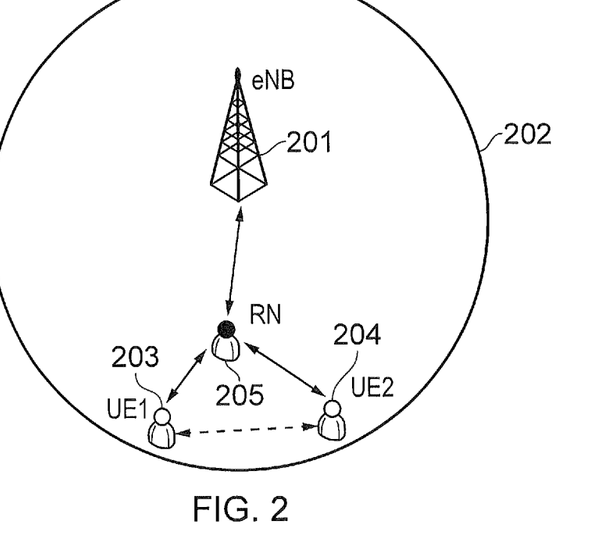
FIG. 2 illustrates an example of D2D communications using a relay node.

FIG. 2 illustrates an example network comprising an eNodeB 201 with a coverage area 202. Two UEs 203 and 204 may communicate with one another using device-todevice (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

In other examples, the backhaul link may also be provided over a wired connection. Relay technologies are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilising for example the spectrum currently being used by GERAN systems as a replacement of one or more GSM carriers
2. 'Guard band operation' utilising the unused resource blocks within a LTE carrier's guard-band
3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rd. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes for Wearable Devices

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay. Another possibility would be to use Bluetooth or Wi-Fi for the relay link (sidelink).

Figure 3:
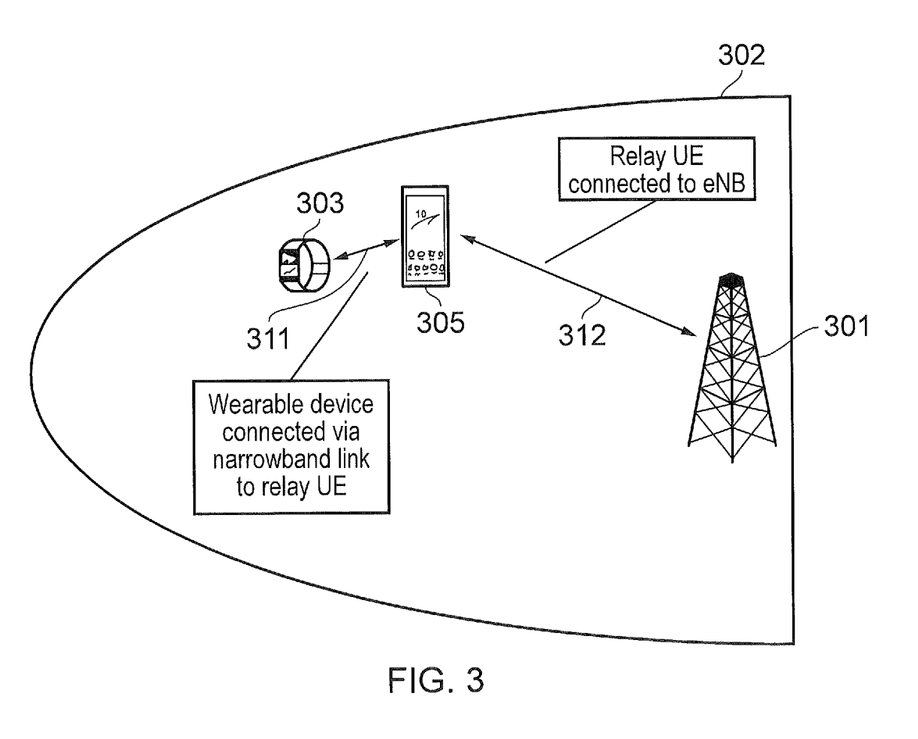
FIG. 3 illustrates an example scenario in which a remote wearable device may communicate with an eNodeB using a communications device as a relay node.

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

Resource allocation will be one of the functionalities to be enhanced on the relay communications device. In order for effective resource allocation, initial access needs to be performed on the access link in order to trigger the following uplink grant allocation if necessary etc. Embodiments of the present disclosure address the initial access issue. The following problems are also addressed by embodiments of the present disclosure:

1. How to adapt conventional RACH procedure to the relay-UE access link?
2. How to address the new waveform/multiple access impact to the legacy RACH procedure?

RACH Procedure for the Relay to UE Link

The random access (RACH) procedure is proposed on the access (D2D, e.g. PC5) link between remote UE and relay. Within it, both bidirectional relay and unidirectional relay are considered, while the control plane only relay and control/user plane relay are included as well.

Before the RACH procedure on access link being initiated, the following prerequisites are required to be fulfilled.

1. The remote UE-relay association is performed. It may be established from discovery/solicitation message or designated by serving eNodeB.
2. Physical layer RACH configuration is broadcasted by relay node if any, or by serving eNodeB indexed by each relay node ID.
3. The preamble group for remote UE-relay random access is available. E.g. preamble group C besides the conventional preamble group A and B.
4. It is for the initial access from idle state.

Figure 4:
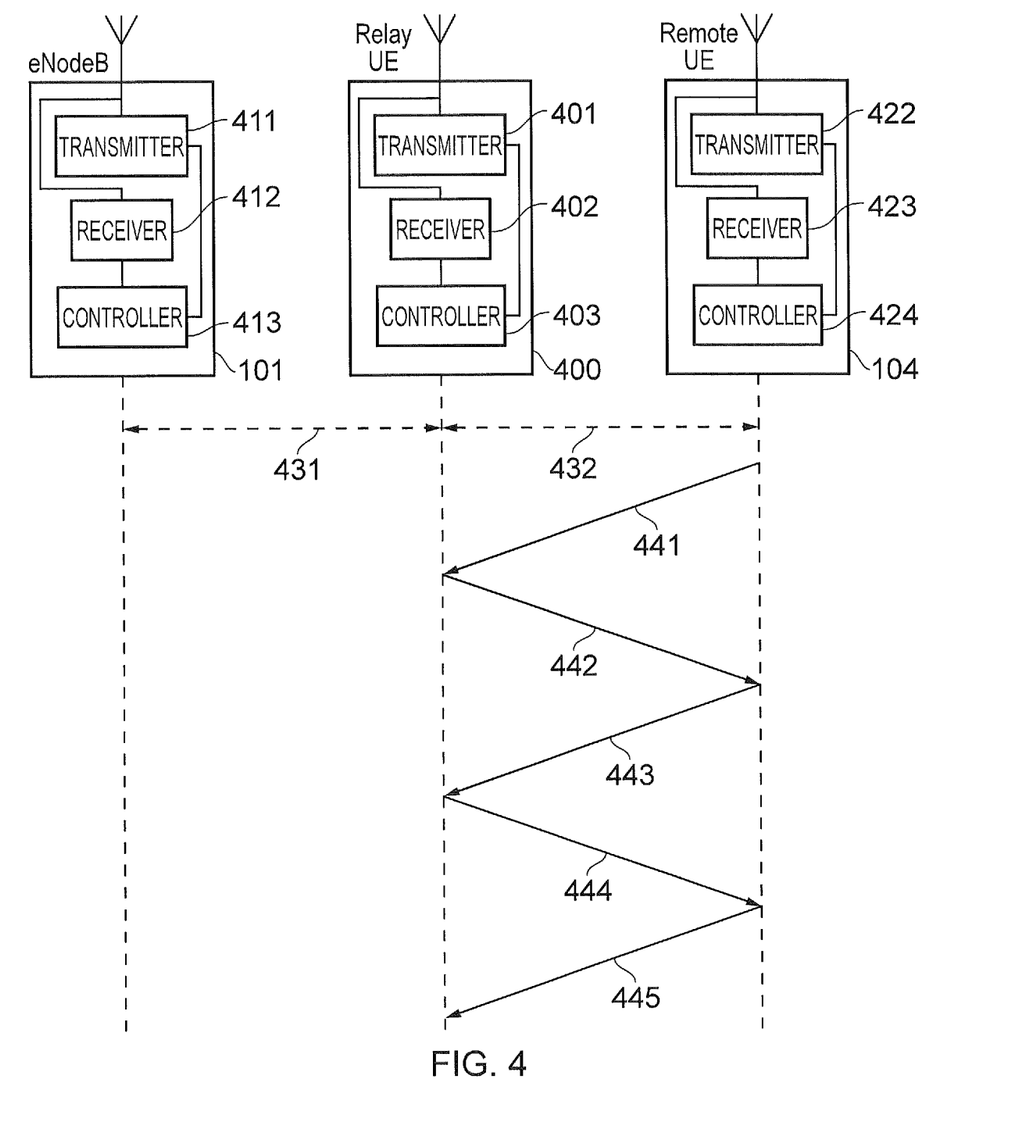
FIG. 4 is a first example of a part schematic representation, part message flow diagram of communications between a UE, an eNodeB and a relay device in accordance with embodiments of the present disclosure.

FIG. 4 is a first example of a part schematic representation, part message flow diagram of communications between a remote UE 104, an eNodeB 101 and a relay device 400 in accordance with embodiments of the present disclosure. Each of the relay device 400, eNodeB 101 and remote UE 104 comprise transmitters 401, 411, 422, receivers 402, 412, 423 and controllers 403, 413, 424. The receiver 402 of the relay device 400 is configured to receive signals representing data via a first wireless access 431 interface from the infrastructure equipment 101 for transmission to the remote communications device 104 and to receive signals representing data via a second wireless access interface 432 from the remote communications device 104 for transmission to the infrastructure equipment 101. The transmitter 401 of the relay device 400 is configured to transmit signals representing data via the first wireless access interface 431 to the infrastructure equipment 101 and to transmit signals representing data via the second wireless access interface 432 to the remote communications device 104. The controller 403 of the relay device 400 is configured to control the transmitter 401 to transmit the signals and to control the receiver 402 to receive the signals. The controller 403 is configured in combination with the transmitter 401 and the receiver 402 to receive 441 from the remote communications device 104 a first random access preamble message, the first random access preamble message comprising an identifier of the remote communications device 104, to transmit 442, in response to the first random access preamble message, a random access response message to the remote communications device 104, the random access response message comprising an indication of communications resources allocated to the remote communications device 104, to receive 443, from the remote communications device 104 and using the communications resources indicated in the random access response message, a scheduled transmission comprising a connection request message and a first contention resolution identifier, and to transmit 444 to the remote communications device 104 a second contention resolution identifier. If the first contention resolution identifier is the same as the second contention resolution identifier, the controller 403 is configured in combination with the receiver 402 to receive 445 an indication from the remote communications device 104 that a successful connection for data communications has been made between the remote communications device 104 and the communications device acting as the relay device 400.

Figure 5:
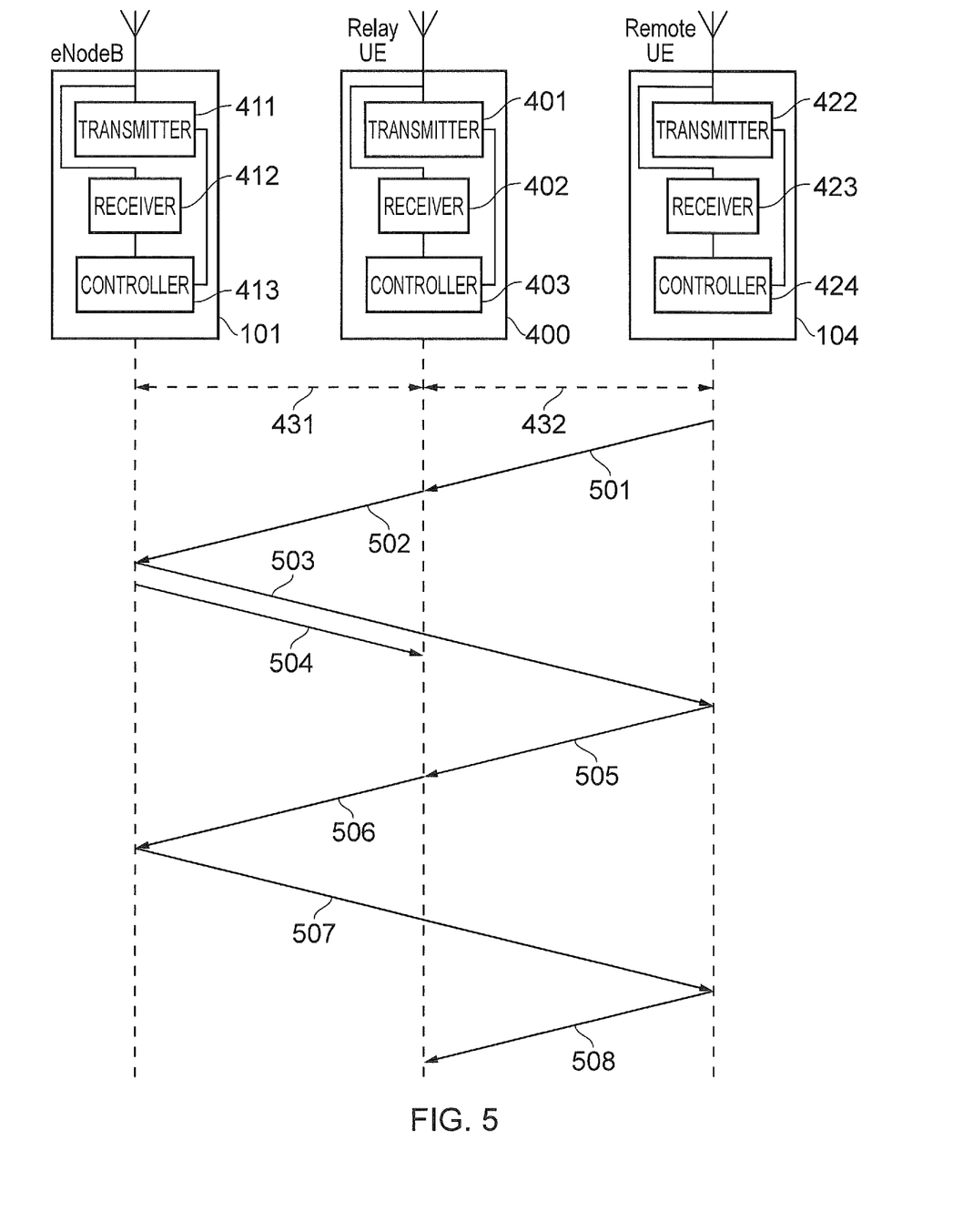
FIG. 5 is a second example of a part schematic representation, part message flow diagram of communications between a UE, an eNodeB and a relay device in accordance with embodiments of the present disclosure.

FIG. 5 is a second example of a part schematic representation, part message flow diagram of communications between a remote UE 104, an eNodeB 101 and a relay device 400 in accordance with embodiments of the present disclosure. Each of the relay device 400, eNodeB 101 and remote UE 104 comprise transmitters 401, 411, 422, receivers 402, 412, 423 and controllers 403, 413, 424. The receiver 402 of the relay device 400 is configured to receive signals representing data via a first wireless access 431 interface from the infrastructure equipment 101 for transmission to the remote communications device 104 and to receive signals representing data via a second wireless access interface 432 from the remote communications device 104 for transmission to the infrastructure equipment 101. The transmitter 401 of the relay device 400 is configured to transmit signals representing data via the first wireless access interface 431 to the infrastructure equipment 101. The controller 403 of the relay device 400 is configured to control the transmitter 401 to transmit the signals and to control the receiver 402 to receive the signals. The controller 403 is configured in combination with the transmitter 401 and the receiver 402 to receive 501 from the remote communications device 104 a first random access preamble message, the first random access preamble message comprising an identifier of the remote communications device 104, to transmit 502 the first random access preamble message to the infrastructure equipment 101, the first random access preamble message indicating to the infrastructure equipment 101 that it should transmit 503 a random access response message to the remote communications device 104, the random access response message comprising an indication of communications resources allocated to the remote communications device 104, to receive 504 from the infrastructure equipment 101 the indication of the communications resources allocated to the remote communications device 104, to receive 505, from the remote communications device 104 and using the communications resources indicated in the random access response message, a scheduled transmission comprising a connection request message and a first contention resolution identifier, and to transmit 506 the scheduled transmission to the infrastructure equipment 101. If the first contention resolution identifier is the same as a second contention resolution identifier transmitted 507 to the remote communications device 104 by the infrastructure equipment 101, the controller 403 is configured in combination with the receiver 402 to receive 508 an indication from the remote communications device 104 that a successful connection for data communications has been made between the remote communications device 104 and the communications device acting as the relay device 400.

The first step of the RACH procedure for the link between the remote UE and the relay is the transmission of the random access preamble, from the remote UE to the relay.
Preparation:
Preambles Allocation.

The preambles for the random access from the remote UE to the relay could be reserved in advance, e.g. in the system information of the eNodeB. The eNodeB will broadcast the reserved preamble sets for the random access from the remote UE to the relay, or it will send dedicated signalling to the relay as well as to remote UEs of the allocated preambles. As an alternative, the relay device (which may also be referred to as a relay node) could broadcast its preambles for access in its system information if any.

If the preamble is dedicated for a certain relay, once the remote UE fails the RACH procedure for connecting to the relay, it could use the same preamble to initiate RACH to the eNodeB. Then, the eNodeB could identify that problems may happen on the relay. It is assumed that the RACH procedure to connect to the relay and the RACH procedure to connect to the eNodeB will located in different resources e.g. PRACH configuration of each relay will be in different time-frequency resources and such configuration is notified by serving eNodeB, similar to the conventional RACH procedure. If the eNodeB knows the RACH resources to the relay, of course, the eNodeB could overhear if necessary.
RACH Transmit Power Threshold.

One of the advantages of accessing to the relay instead of to the eNodeB is to save the transmit power of the remote UE. If the remote UE transmits with a similar or same power on RACH, there is no need to transmit via relay. The threshold is indicated to the remote UE of the allowable maximum transmit power to relay. If the calculated transmit power is greater than this value, the remote UE will initiate RACH to the eNodeB instead. This threshold can be broadcast in system information e.g. the eNodeB or the relay will indicate it in the system information or this threshold can be UE specific, e.g. be configured by RRC signalling so that the remote UE can set up each configuration of RACH to relay or eNodeB based on comparison of the calculated transmit power to the threshold.
Data Type Indication.

The relay may relay control plane and/or user plane data. With different relayed data, the transmission priority may differ. Hence, such an indicator of expected data to be transmitted will help the following RACH optimisation as well as resource scheduling. As an alternative, for different control plane and user plane data, the priorities could be further extended.

As described above, the remote UE will
(1) Select a preamble;
(2) Determine next available PRACH resources;
(3) Calculate transmit power
And then transmit the selected preamble.

The second step of the RACH procedure for the link between the remote UE and the relay is the random access response, transmitted from the relay to the remote UE.

After receiving the preamble from the remote UE, the relay will send a random access response to the remote UE. The random access response may include:

Backoff Indicator.

For the control plane signalling and high priority data plane data, smaller value will be indicated. It is allowed for there to be multiple MAC subheaders with different BI values which are multiplexed in one MAC PDU.

Timing Advance Command.

This field is optional as it's expected that the relay and remote UEs are in proximity. Hence the time advances between different remote UEs to relay may have only little difference. As an alternative, the relay UE may broadcast a TA reference value in e.g. its SI if any or by serving eNodeB, then in the Timing advance command, only the delta value to the reference value will be indicated.

UL Grant.

The relay node will allocate an UL grant from its pre-allocated resource pools by eNodeB, or send a scheduling request to eNodeB for asking the allocation of UL grant for the RACH from remote UE.

Temporary Remote UE ID if any.

This temporary remote communications device identifier is used for further communications between the remote communications device and the communications device acting as the relay device, and the temporary remote communications device identifier may be specific within a communication range of the relay device. The communications range may define a maximum distance to which the relay device can communicate.

Preamble Identifier.

This field is to identify whether the received random access response from relay is for the remote UE who sent the same random access preamble.

As an alternative, after the relay receives the RACH preamble from the remote UE, it will forward it to the eNodeB and wait for the eNodeB to send the random access response if any. After receiving the response, the relay will forward the response to the remote UE. One option is that the relay will broadcast the response to all its serving remote UEs and rely on the remote UE to identify whether this response is intended for it itself. As the other option, the serving eNodeB will indicate what the preamble identifier is (in the response) and the relay will forward to the corresponding remote UE.

If the relay device is a unidirectional relay, the eNodeB will send a random access response to its UE directly. However, the eNodeB will also notify the relay of what the allocated UL grant is and what the temporary remote UE ID is in order to receive/send (in case the contention resolution is sent by the relay) the follow-up RACH message.

The remote UE may monitor the physical control channel to receive the response from relay or eNodeB and apply the parameters in each field of the matched response.

The third step of the RACH procedure for the link between the remote UE and the relay is a scheduled transmission, transmitted from the remote UE to the relay. This message may include:

RRC Message.

For initial access, the scheduled transmission will include a radio resource control (RRC) connection request message. There are two options in order to do this.

Option 1: The scheduled transmission will include the RRC connection request message for the remote UE and the relay. After receiving this message, RRC will be established between the remote UE and the relay.

Option 2: The scheduled transmission will include a RRC connection request message for the UE and its serving eNodeB. After receiving this message, the relay will forward the request to the eNodeB. Then, for the bidirectional relay, the follow-up RRC messages e.g. RRC connection setup will be transmitted via relay to remote UE as well. For the unidirectional relay, the eNodeB will send the follow-up RRC messages e.g. RRC connection setup to the UE directly.

UE Contention Resolution Identifier.

This UE identifier could be relay range specific or the eNodeB range specific and it is for contention resolution. After the relay receives the scheduled transmission from remote UE, it will proceed by itself or forward it to eNodeB.

The final step of the RACH procedure for the link between the remote UE and the relay is contention resolution, transmitted from the relay to the remote UE.

The relay will send contention resolution to remote UE and it will include:

UE Contention Resolution Identifier.

If the UE contention resolution identifier is the same as the identifier in scheduled transmission, the contention resolution is considered successful. Otherwise another RACH preamble will be sent according to the BI setting and maximum preamble transmission count.

As an alternative, the relay will forward contention resolution received from the eNodeB to the remote UE. If the relay device is a unidirectional relay, the eNodeB will send random access response to its UE directly.

Figure 6:
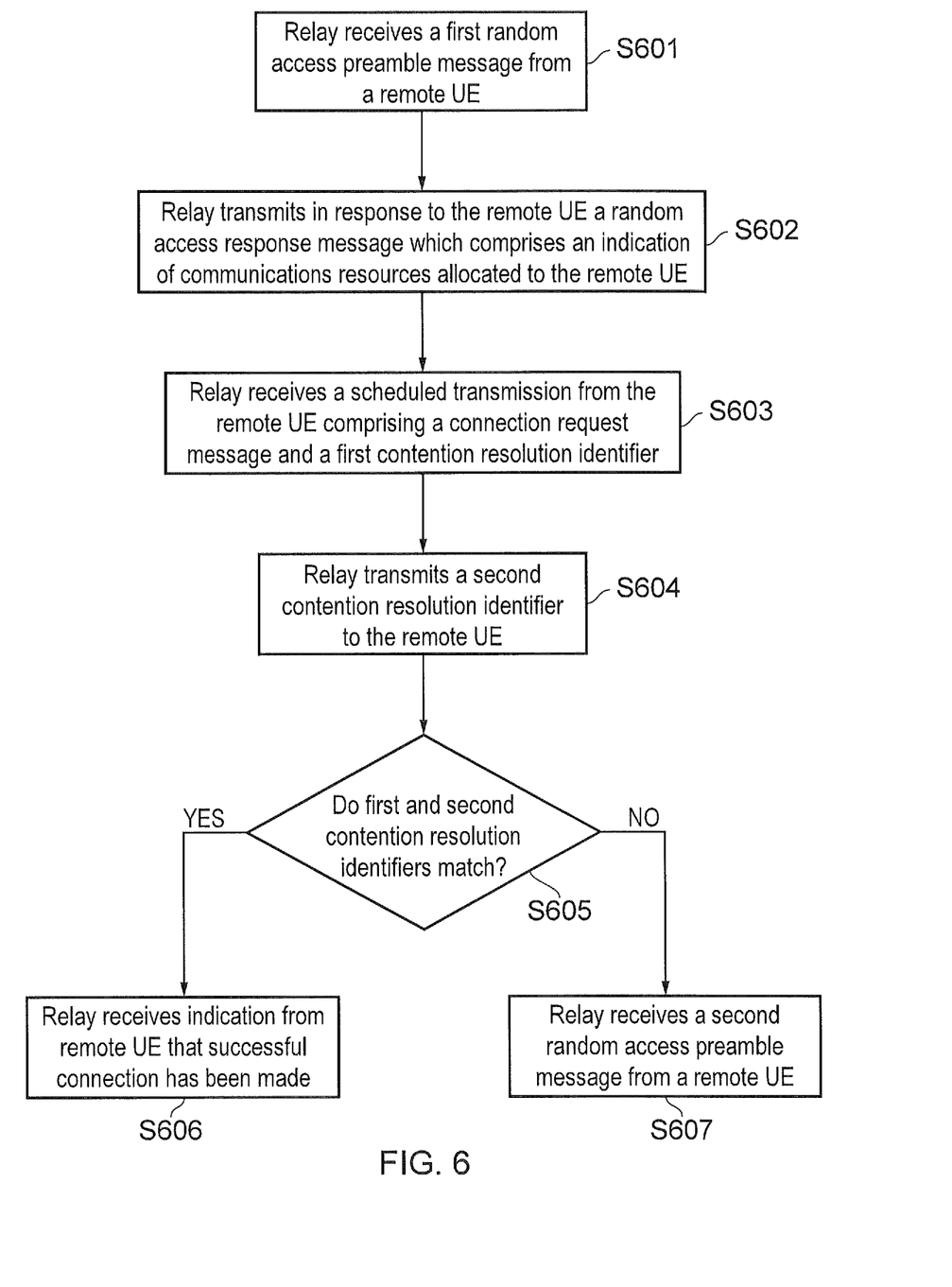
FIG. 6 shows a flow diagram illustrating a first process of communications between a remote UE, an eNodeB and a relay device in accordance with embodiments of the present disclosure.

FIG. 6 shows a flow diagram illustrating a first process of communications between a remote UE, an eNodeB and a relay device in accordance with embodiments of the present disclosure. The method starts in step S601, in which the relay receives a first random access preamble message from the remote UE. In step S602, the relay transmits, in response to the first random access preamble message, a random access response message, which comprises an indication of communications resources allocated to the remote UE. In step S603, the relay receives a scheduled transmission from the remote UE comprising a connection request message and a first contention resolution identifier. In step S604, the relay transmits a second contention resolution identifier to the remote UE. In step S605, the remote UE determines whether the first and second contention resolution identifiers match. If they do, the method concludes in step S606, in which the relay receives an indication from the remote UE that a successful connection between the remote UE and the relay device has been made. However, if the first and second contention resolution identifiers do not match, in step S607, the relay receives a second random access preamble message from the remote UE.

Figure 7:
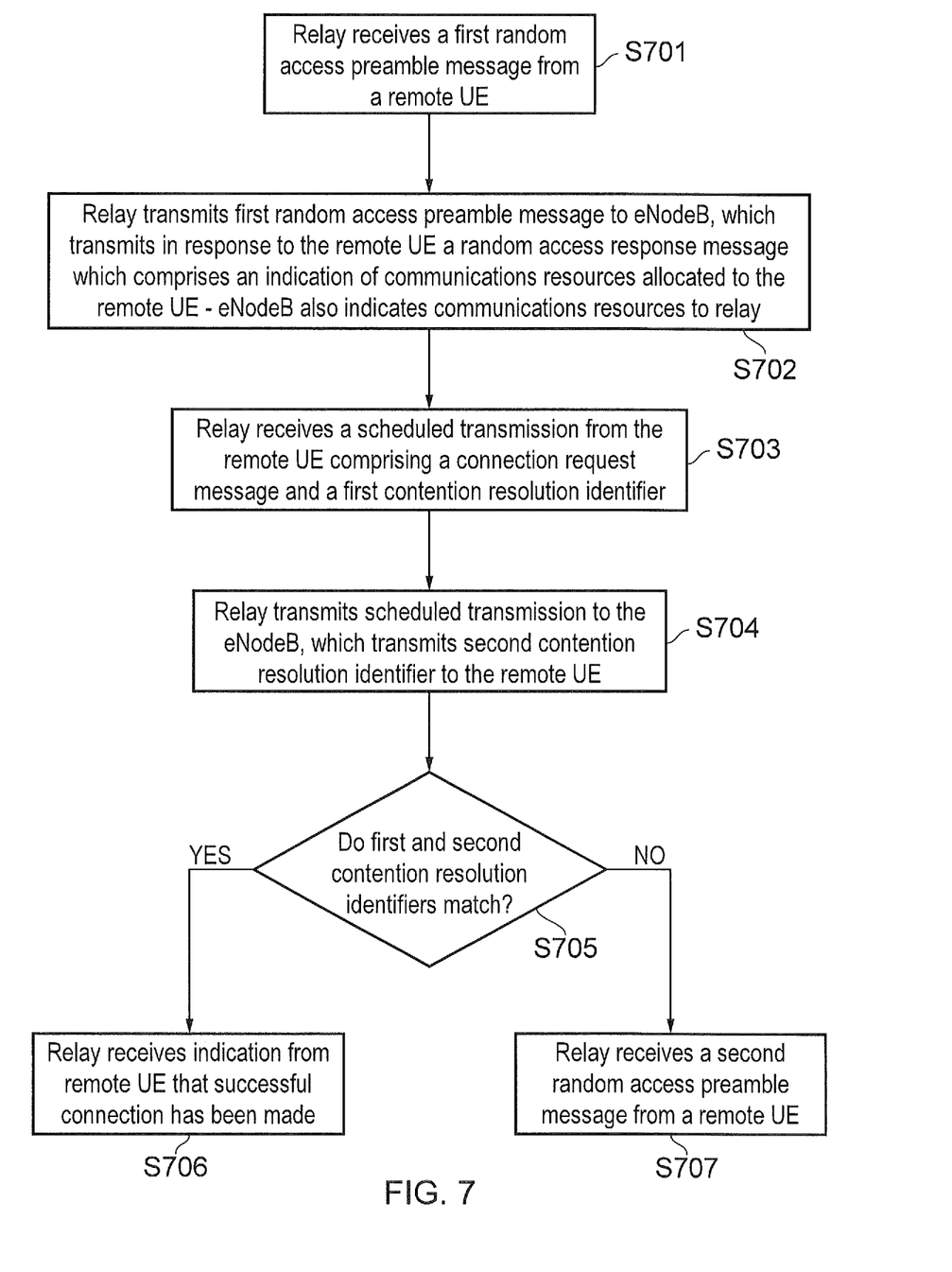
FIG. 7 shows a flow diagram illustrating a second process of communications between a remote UE, an eNodeB and a relay device in accordance with embodiments of the present disclosure.

FIG. 7 shows a flow diagram illustrating a second process of communications between a remote UE, an eNodeB and a relay device in accordance with embodiments of the present disclosure. The method starts in step S701, in which the relay receives a first random access preamble message from the remote UE. In step S702, the relay transmits the first random access preamble message to the eNodeB, which transmits in response to the remote UE a random access response message, which comprises an indication of communications resources allocated to the remote UE. The eNodeB also indicates to the relay the communications resources which have been allocated to the remote UE. In step S703, the relay receives a scheduled transmission from the remote UE comprising a connection request message and a first contention resolution identifier. In step S704, the relay transmits the scheduled transmission to the eNodeB, which transmits in response a second contention resolution identifier to the remote UE. In step S705, the remote UE determines whether the first and second contention resolution identifiers match. If they do, the method concludes in step S706, in which the relay receives an indication from the remote UE that a successful connection between the remote UE and the relay device has been made. However, if the first and second contention resolution identifiers do not match, in step S707, the relay receives a second random access preamble message from the remote UE.

Embodiments of the present disclosure therefore address the initial access issue, and describe how the presently employed RACH procedure can be adapted for the communications link between a relay device and a remote (wearable) UE. This contributes to the advantages of using a relay node to relay communications between wearable devices and infrastructure equipment, particularly including the saving of power at the wearable devices.

The following numbered paragraphs provide further example aspects and features of the present technique:

Paragraph 1. A communications device acting as a relay device configured to communicate with an infrastructure equipment of a mobile communications network and a remote communications device operating with the mobile communications network, the communications device acting as the relay device comprising     a receiver configured to receive signals representing data via a first wireless access interface from the infrastructure equipment for transmission to the remote communications device and to receive signals representing data via a second wireless access interface from the remote communications device for transmission to the infrastructure equipment,     a transmitter configured to transmit signals representing data via the first wireless access interface to the infrastructure equipment and to transmit signals representing data via the second wireless access interface to the remote communications device, and     a controller configured to control the transmitter to transmit the signals and to control the receiver to receive the signals, wherein the controller is configured in combination with the transmitter and the receiver     to receive from the remote communications device a first random access preamble message, the first random access preamble message comprising an identifier of the remote communications device,     to transmit, in response to the first random access preamble message, a random access response message to the remote communications device, the random access response message comprising an indication of communications resources allocated to the remote communications device,     to receive, from the remote communications device and using the communications resources indicated in the random access response message, a scheduled transmission comprising a connection request message and a first contention resolution identifier, and     to transmit to the remote communications device a second contention resolution identifier,     wherein if the first contention resolution identifier is the same as the second contention resolution identifier, the controller is configured in combination with the receiver     to receive an indication from the remote communications device that a successful connection for data communications has been made between the remote communications device and the communications device acting as the relay device.

Paragraph 2. A communications device acting as a relay device according to Paragraph 1, wherein the random access response message comprises a backoff indicator, the backoff indicator indicating a time delay between multiple random access preamble messages transmitted by the remote communications device.

Paragraph 3. A communications device acting as a relay device according to Paragraph 2, wherein if the first contention resolution identifier is different to the second contention resolution identifier, the controller is configured in combination with the receiver to receive from the remote communications device a second random access preamble message in accordance with the time delay indicated by the backoff indicator, the second random access preamble comprising an identifier of the remote communications device and being different to the first random access preamble message.

Paragraph 4. A communications device acting as a relay device according to Paragraph 3, wherein at least one of the first random access preamble message and the second random access preamble message is provided from     system information broadcast by the infrastructure equipment to at least one of the remote communications device and the communications device acting as the relay device, or     signalled by the infrastructure equipment to at least one of the remote communications device and the communications device acting as the relay device, or     system information broadcast by the communications device acting as the relay device to the remote communications device.

Paragraph 5. A communications device acting as a relay device according to Paragraph 3 or Paragraph 4, wherein at least one of the first random access preamble message and the second random access preamble message is received from the remote communications device if the remote communications device has determined that a required transmit power to transmit the at least one of the first random access preamble message and the second random access preamble message to the communications device acting as the relay device is smaller than a predetermined threshold, the predetermined threshold being provided from by either     system information broadcast by the infrastructure equipment to the remote communications device, or     system information transmitted by the communications device acting as the relay device to the remote communications device, or     radio resource control signalling transmitted to the remote communications device.

Paragraph 6. A communications device acting as a relay device according to any of Paragraphs 1 to 5, wherein the random access response message comprises a timing advance command, the timing advance command comprising an indication that the remote communications device should adjust its timing such that signals received from different remote communications devices can be aligned at the relay device.

Paragraph 7. A communications device acting as a relay device according to any of Paragraphs 1 to 6, wherein the communications resources allocated to the remote communications device are allocated from communications resources which have been pre-allocated to the communications device acting as the relay device by the infrastructure equipment.

Paragraph 8. A communications device acting as a relay device according to any of Paragraphs 1 to 7, wherein, in response to the first random access preamble message, the controller is configured in combination with the transmitter and the receiver
- to transmit a scheduling request message to the infrastructure equipment,
- to receive an indication of communications resources to be allocated to the remote communications device, and
- to include the indication of the communications resources to be allocated to the remote communications device in the random access response message.

Paragraph 9. A communications device acting as a relay device according to any of Paragraphs 1 to 8, wherein the random access response message comprises a temporary remote communications device identifier, the temporary remote communications device identifier being used for further communications between the remote communications device and the communications device acting as the relay device, wherein the temporary remote communications device identifier is specific within a communication range of the relay device.

Paragraph 10. A communications device acting as a relay device according to any of Paragraphs 1 to 9, wherein the random access response message comprises a preamble identifier, the preamble identifier being used by the remote communications device to identify whether the random access response message is for the remote communications device or if the random access response message is for another communications device.

Paragraph 11. A communications device acting as a relay device according to any of Paragraphs 1 to 10, wherein the controller is configured in combination with the transmitter and the receiver
- to transmit the received first random access preamble message to the infrastructure equipment,
- to receive, from the infrastructure equipment, the random access response message, and
- to transmit the received random access response message to the remote communications device.

Paragraph 12. A communications device acting as a relay device according to Paragraph 11, wherein the controller is configured in combination with the transmitter and the receiver
- to transmit the received random access response message to the remote communications device and one or more other communications devices.

Paragraph 13. A communications device acting as a relay device configured to communicate with an infrastructure equipment of a mobile communications network and a remote communications device operating with the mobile communications network, the communications device acting as the relay device comprising
- a receiver configured to receive signals representing data via a first wireless access interface from the infrastructure equipment and to receive signals representing data via a second wireless access interface from the remote communications device for transmission to the infrastructure equipment,
- a transmitter configured to transmit signals representing data via the first wireless access interface to the infrastructure equipment, and
- a controller configured to control the transmitter to transmit the signals and to control the receiver to receive the signals, wherein the controller is configured in combination with the transmitter and the receiver
- to receive from the remote communications device a first random access preamble message, the first random access preamble message comprising an identifier of the remote communications device,
- to transmit the first random access preamble message to the infrastructure equipment, the first random access preamble message indicating to the infrastructure equipment that it should transmit a random access response message to the remote communications device, the random access response message comprising an indication of communications resources allocated to the remote communications device,
- to receive from the infrastructure equipment the indication of the communications resources allocated to the remote communications device,
- to receive, from the remote communications device and using the communications resources indicated in the random access response message, a scheduled transmission comprising a connection request message and a first contention resolution identifier, and
- to transmit the scheduled transmission to the infrastructure equipment,
- wherein if the first contention resolution identifier is the same as a second contention resolution identifier transmitted to the remote communications device by the infrastructure equipment, the controller is configured in combination with the receiver
- to receive an indication from the remote communications device that a successful connection for data communications has been made between the remote communications device and the communications device acting as the relay device.

Paragraph 14. A communications device acting as a relay device according to Paragraph 13, wherein the random access response message comprises a backoff indicator, the backoff indicator indicating a time delay between multiple random access preamble messages transmitted by the remote communications device.

Paragraph 15. A communications device acting as a relay device according to Paragraph 14, wherein if the first contention resolution identifier is different to the second contention resolution identifier, the controller is configured in combination with the receiver to receive from the remote communications device a second random access preamble message in accordance with the time delay indicated by the backoff indicator, the second random access preamble comprising an identifier of the remote communications device and being different to the first random access preamble message.

Paragraph 16. A communications device acting as a relay device according to Paragraph 15, wherein at least one of the first random access preamble message and the second random access preamble message is provided by either
- system information broadcast by the infrastructure equipment to at least one of the remote communications device and the communications device acting as the relay device, or signalled by the infrastructure equipment to at least one of the remote communications device and the communications device acting as the relay device, or system information broadcast by the communications device acting as the relay device to the remote communications device.

Paragraph 17. A communications device acting as a relay device according to Paragraph 15, wherein at least one of the first random access preamble message and the second random access preamble message is received from the remote communications device if the remote communications device has determined that a required transmit power to transmit the at least one of the first random access preamble message and the second random access preamble message to the communications device acting as the relay device is smaller than a predetermined threshold, wherein the predetermined threshold is provided from either system information broadcast by the infrastructure equipment to the remote communications device, or system information broadcast by the communications device acting as the relay device to the remote communications device, or radio resource control signalling transmitted to the remote communications device.

Paragraph 18. A communications device acting as a relay device according to any of Paragraphs 13 to 17, wherein the random access response message comprises a timing advance command, the timing advance command comprising an indication that the remote communications device should adjust its timing such that signals received from different remote communications devices can be aligned at the relay device.

Paragraph 19. A communications device acting as a relay device according to any of Paragraphs 13 to 18, wherein the random access response message comprises a temporary remote communications device identifier, the temporary remote communications device identifier being used for further communications between the remote communications device and the communications device acting as the relay device, wherein the controller is configured in combination with the receiver to receive an indication of the temporary remote communications device identifier from the infrastructure equipment, and wherein the temporary remote communications device identifier is specific within a communication range of the relay device.

Paragraph 20. A communications device acting as a relay device according to any of Paragraphs 13 to 19, wherein the random access response message comprises a preamble identifier, the preamble identifier being used by the remote communications device to identify whether the random access response message is for the remote communications device or if the random access response message is for another communications device.

Paragraph 21. A method of operating a communications device acting as a relay device configured to communicate with an infrastructure equipment of a mobile communications network and a remote communications device operating with the mobile communications network, the method comprising receiving from the remote communications device via a second wireless access interface a first random access preamble message, the first random access preamble message comprising an identifier of the remote communications device, transmitting, in response to the first random access preamble message, a random access response message to the remote communications device, the random access response message comprising an indication of communications resources allocated to the remote communications device, receiving, from the remote communications device and using the communications resources indicated in the random access response message, a scheduled transmission comprising a connection request message and a first contention resolution identifier, and transmitting to the remote communications device a second contention resolution identifier, wherein if the first contention resolution identifier is the same as the second contention resolution identifier, the method comprises receiving an indication from the remote communications device that a successful connection for data communications has been made between the remote communications device and the communications device acting as the relay device.

Paragraph 22. A method of operating a communications device acting as a relay device configured to communicate with an infrastructure equipment of a mobile communications network and a remote communications device operating with the mobile communications network, the method comprising receiving from the remote communications device via a second wireless access interface a first random access preamble message, the first random access preamble message comprising an identifier of the remote communications device, transmitting the first random access preamble message to the infrastructure equipment via a first wireless access interface, the first random access preamble message indicating to the infrastructure equipment that it should transmit a random access response message to the remote communications device, the random access response message comprising an indication of communications resources allocated to the remote communications device, receiving from the infrastructure equipment the indication of the communications resources allocated to the remote communications device, receiving, from the remote communications device and using the communications resources indicated in the random access response message, a scheduled transmission comprising a connection request message and a first contention resolution identifier, and transmitting the scheduled transmission to the infrastructure equipment, wherein if the first contention resolution identifier is the same as a second contention resolution identifier transmitted to the remote communications device by the infrastructure equipment, the method comprises receiving an indication from the remote communications device that a successful connection for data communications has been made between the remote communications device and the communications device acting as the relay device.

Paragraph 23. Circuitry for a communications device acting as a relay device configured to communicate with an infrastructure equipment of a mobile communications network and a remote communications device operating with the mobile communications network, the communications device acting as the relay device comprising a receiver configured to receive signals representing data via a first wireless access interface from the infrastructure equipment for transmission to the remote communications device and to receive signals representing data via a second wireless access interface from the remote communications device for transmission to the infrastructure equipment, a transmitter configured to transmit signals representing data via the first wireless access interface to the infrastructure equipment and to transmit signals representing data via the second wireless access interface to the remote communications device, and a controller configured to control the transmitter to transmit the signals and to control the receiver to receive the signals, wherein the controller is configured in combination with the transmitter and the receiver to receive from the remote communications device a first random access preamble message, the first random access preamble message comprising an identifier of the remote communications device, to transmit, in response to the first random access preamble message, a random access response message to the remote communications device, the random access response message comprising an indication of communications resources allocated to the remote communications device, to receive, from the remote communications device and using the communications resources indicated in the random access response message, a scheduled transmission comprising a connection request message and a first contention resolution identifier, and to transmit to the remote communications device a second contention resolution identifier, wherein if the first contention resolution identifier is the same as the second contention resolution identifier, the controller is configured in combination with the receiver to receive an indication from the remote communications device that a successful connection for data communications has been made between the remote communications device and the communications device acting as the relay device.

Paragraph 24. Circuitry for a communications device acting as a relay device configured to communicate with an infrastructure equipment of a mobile communications network and a remote communications device operating with the mobile communications network, the communications device acting as the relay device comprising a receiver configured to receive signals representing data via a first wireless access interface from the infrastructure equipment and to receive signals representing data via a second wireless access interface from the remote communications device for transmission to the infrastructure equipment, a transmitter configured to transmit signals representing data via the first wireless access interface to the infrastructure equipment, and a controller configured to control the transmitter to transmit the signals and to control the receiver to receive the signals, wherein the controller is configured in combination with the transmitter and the receiver to receive from the remote communications device a first random access preamble message, the first random access preamble message comprising an identifier of the remote communications device, to transmit the first random access preamble message to the infrastructure equipment, the first random access preamble message indicating to the infrastructure equipment that it should transmit a random access response message to the remote communications device, the random access response message comprising an indication of communications resources allocated to the remote communications device, to receive from the infrastructure equipment the indication of the communications resources allocated to the remote communications device, to receive, from the remote communications device and using the communications resources indicated in the random access response message, a scheduled transmission comprising a connection request message and a first contention resolution identifier, and to transmit the scheduled transmission to the infrastructure equipment, wherein if the first contention resolution identifier is the same as a second contention resolution identifier transmitted to the remote communications device by the infrastructure equipment, the controller is configured in combination with the receiver to receive an indication from the remote communications device that a successful connection for data communications has been made between the remote communications device and the communications device acting as the relay device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.

What is claimed is:

1. A communications device acting as a relay device configured to communicate with an infrastructure equipment of a mobile communications network and a remote communications device operating with the mobile communications network, the communications device acting as the relay device comprising:
 a receiver configured to receive signals representing data via a first wireless access interface from the infrastructure equipment for transmission to the remote communications device and to receive signals representing data via a second wireless access interface from the remote communications device for transmission to the infrastructure equipment,
 a transmitter configured to transmit signals representing data via the first wireless access interface to the infrastructure equipment and to transmit signals representing data via the second wireless access interface to the remote communications device, and
 a controller configured to control the transmitter to transmit the signals and to control the receiver to receive the signals, wherein the controller is configured in combination with the transmitter and the receiver
  to receive from the remote communications device a first random access preamble message, the first random access preamble message comprising an identifier of the remote communications device,
  to transmit, in response to the first random access preamble message, a random access response message to the remote communications device, the random access response message comprising an indication of communications resources allocated to the remote communications device,
  to receive, from the remote communications device and using the communications resources indicated in the random access response message, a scheduled transmission comprising a connection request message and a first contention resolution identifier, and
  to transmit to the remote communications device a second contention resolution identifier,
 wherein in response to determining that the first contention resolution identifier is the same as the second contention resolution identifier, the controller is configured in combination with the receiver
  to receive an indication from the remote communications device that a successful connection for data communications has been made between the remote communications device and the communications device acting as the relay device.

2. A communications device acting as a relay device as claimed in claim 1, wherein the random access response message comprises a backoff indicator, the backoff indicator indicating a time delay between multiple random access preamble messages transmitted by the remote communications device.

3. A communications device acting as a relay device as claimed in claim 2, wherein in response to determining that the first contention resolution identifier is different to the second contention resolution identifier, the controller is configured in combination with the receiver to receive from the remote communications device a second random access preamble message in accordance with the time delay indicated by the backoff indicator, the second random access preamble comprising an identifier of the remote communications device and being different to the first random access preamble message.

4. A communications device acting as a relay device as claimed in claim 3, wherein at least one of the first random access preamble message and the second random access preamble message is provided from
 system information broadcast by the infrastructure equipment to at least one of the remote communications device and the communications device acting as the relay device, or
 signalled by the infrastructure equipment to at least one of the remote communications device and the communications device acting as the relay device, or
 system information broadcast by the communications device acting as the relay device to the remote communications device.

5. A communications device acting as a relay device as claimed in claim 3, wherein at least one of the first random access preamble message and the second random access preamble message is received from the remote communications device if the remote communications device has determined that a required transmit power to transmit the at least one of the first random access preamble message and the second random access preamble message to the communications device acting as the relay device is smaller than a predetermined threshold, the predetermined threshold being provided from by either
 system information broadcast by the infrastructure equipment to the remote communications device, or
 system information transmitted by the communications device acting as the relay device to the remote communications device, or
 radio resource control signalling transmitted to the remote communications device.

6. A communications device acting as a relay device as claimed in claim 1, wherein the random access response message comprises a timing advance command, the timing advance command comprising an indication that the remote communications device should adjust its timing such that signals received from different remote communications devices can be aligned at the relay device.

7. A communications device acting as a relay device as claimed in claim 1, wherein the communications resources allocated to the remote communications device are allocated from communications resources which have been pre-allocated to the communications device acting as the relay device by the infrastructure equipment.

8. A communications device acting as a relay device as claimed in claim 1, wherein, in response to the first random access preamble message, the controller is configured in combination with the transmitter and the receiver
 to transmit a scheduling request message to the infrastructure equipment,
 to receive an indication of communications resources to be allocated to the remote communications device, and
 to include the indication of the communications resources to be allocated to the remote communications device in the random access response message.

9. A communications device acting as a relay device as claimed in claim 1, wherein the random access response message comprises a temporary remote communications device identifier, the temporary remote communications device identifier being used for further communications between the remote communications device and the communications device acting as the relay device, wherein the temporary remote communications device identifier is specific within a communication range of the relay device.

10. A communications device acting as a relay device as claimed in claim 1, wherein the random access response message comprises a preamble identifier, the preamble identifier being used by the remote communications device to identify whether the random access response message is for the remote communications device or if the random access response message is for another communications device.

11. A communications device acting as a relay device as claimed in claim 1, wherein the controller is configured in combination with the transmitter and the receiver
to transmit the received first random access preamble message to the infrastructure equipment,
to receive, from the infrastructure equipment, the random access response message, and
to transmit the received random access response message to the remote communications device.

12. A communications device acting as a relay device as claimed in claim 11, wherein the controller is configured in combination with the transmitter and the receiver
to transmit the received random access response message to the remote communications device and one or more other communications devices.

13. A communications device acting as a relay device configured to communicate with an infrastructure equipment of a mobile communications network and a remote communications device operating with the mobile communications network, the communications device acting as the relay device comprising:
a receiver configured to receive signals representing data via a first wireless access interface from the infrastructure equipment and to receive signals representing data via a second wireless access interface from the remote communications device for transmission to the infrastructure equipment,
a transmitter configured to transmit signals representing data via the first wireless access interface to the infrastructure equipment, and
a controller configured to control the transmitter to transmit the signals and to control the receiver to receive the signals, wherein the controller is configured in combination with the transmitter and the receiver
to receive from the remote communications device a first random access preamble message, the first random access preamble message comprising an identifier of the remote communications device,
to transmit the first random access preamble message to the infrastructure equipment, the first random access preamble message indicating to the infrastructure equipment that it should transmit a random access response message to the remote communications device, the random access response message comprising an indication of communications resources allocated to the remote communications device,
to receive from the infrastructure equipment the indication of the communications resources allocated to the remote communications device,
to receive, from the remote communications device and using the communications resources indicated in the random access response message, a scheduled transmission comprising a connection request message and a first contention resolution identifier, and
to transmit the scheduled transmission to the infrastructure equipment,
wherein in response to determining that the first contention resolution identifier is the same as a second contention resolution identifier transmitted to the remote communications device by the infrastructure equipment, the controller is configured in combination with the receiver
to receive an indication from the remote communications device that a successful connection for data communications has been made between the remote communications device and the communications device acting as the relay device.

14. A communications device acting as a relay device as claimed in claim 13, wherein the random access response message comprises a backoff indicator, the backoff indicator indicating a time delay between multiple random access preamble messages transmitted by the remote communications device.

15. A communications device acting as a relay device as claimed in claim 14, wherein in response to determining that the first contention resolution identifier is different to the second contention resolution identifier, the controller is configured in combination with the receiver to receive from the remote communications device a second random access preamble message in accordance with the time delay indicated by the backoff indicator, the second random access preamble comprising an identifier of the remote communications device and being different to the first random access preamble message.

16. A communications device acting as a relay device as claimed in claim 15, wherein at least one of the first random access preamble message and the second random access preamble message is provided by either
system information broadcast by the infrastructure equipment to at least one of the remote communications device and the communications device acting as the relay device, or
signalled by the infrastructure equipment to at least one of the remote communications device and the communications device acting as the relay device, or
system information broadcast by the communications device acting as the relay device to the remote communications device.

17. A communications device acting as a relay device as claimed in claim 15, wherein at least one of the first random access preamble message and the second random access preamble message is received from the remote communications device if the remote communications device has determined that a required transmit power to transmit the at least one of the first random access preamble message and the second random access preamble message to the communications device acting as the relay device is smaller than a predetermined threshold, wherein the predetermined threshold is provided from either
system information broadcast by the infrastructure equipment to the remote communications device, or
system information broadcast by the communications device acting as the relay device to the remote communications device, or
radio resource control signalling transmitted to the remote communications device.

18. A communications device acting as a relay device as claimed in claim 13, wherein the random access response message comprises a timing advance command, the timing advance command comprising an indication that the remote communications device should adjust its timing such that signals received from different remote communications devices can be aligned at the relay device.

19. A communications device acting as a relay device as claimed in claim 13, wherein the random access response message comprises a temporary remote communications device identifier, the temporary remote communications device identifier being used for further communications between the remote communications device and the communications device acting as the relay device, wherein the controller is configured in combination with the receiver to receive an indication of the temporary remote communications device identifier from the infrastructure equipment, and wherein the temporary remote communications device identifier is specific within a communication range of the relay device.

20. A communications device acting as a relay device as claimed in claim 13, wherein the random access response message comprises a preamble identifier, the preamble identifier being used by the remote communications device to identify whether the random access response message is for the remote communications device or if the random access response message is for another communications device.

21. A method of operating a communications device acting as a relay device configured to communicate with an infrastructure equipment of a mobile communications network and a remote communications device operating with the mobile communications network, the method comprising:

receiving from the remote communications device via a wireless access interface a first random access preamble message, the first random access preamble message comprising an identifier of the remote communications device, transmitting, in response to the first random access preamble message, a random access response message to the remote communications device, the random access response message comprising an indication of communications resources allocated to the remote communications device, receiving, from the remote communications device and using the communications resources indicated in the random access response message, a scheduled transmission comprising a connection request message and a first contention resolution identifier, and transmitting to the remote communications device a second contention resolution identifier, wherein in response to determining that the first contention resolution identifier is the same as the second contention resolution identifier, the method comprises receiving an indication from the remote communications device that a successful connection for data communications has been made between the remote communications device and the communications device acting as the relay device.

* * * * *